Patented Feb. 21, 1939

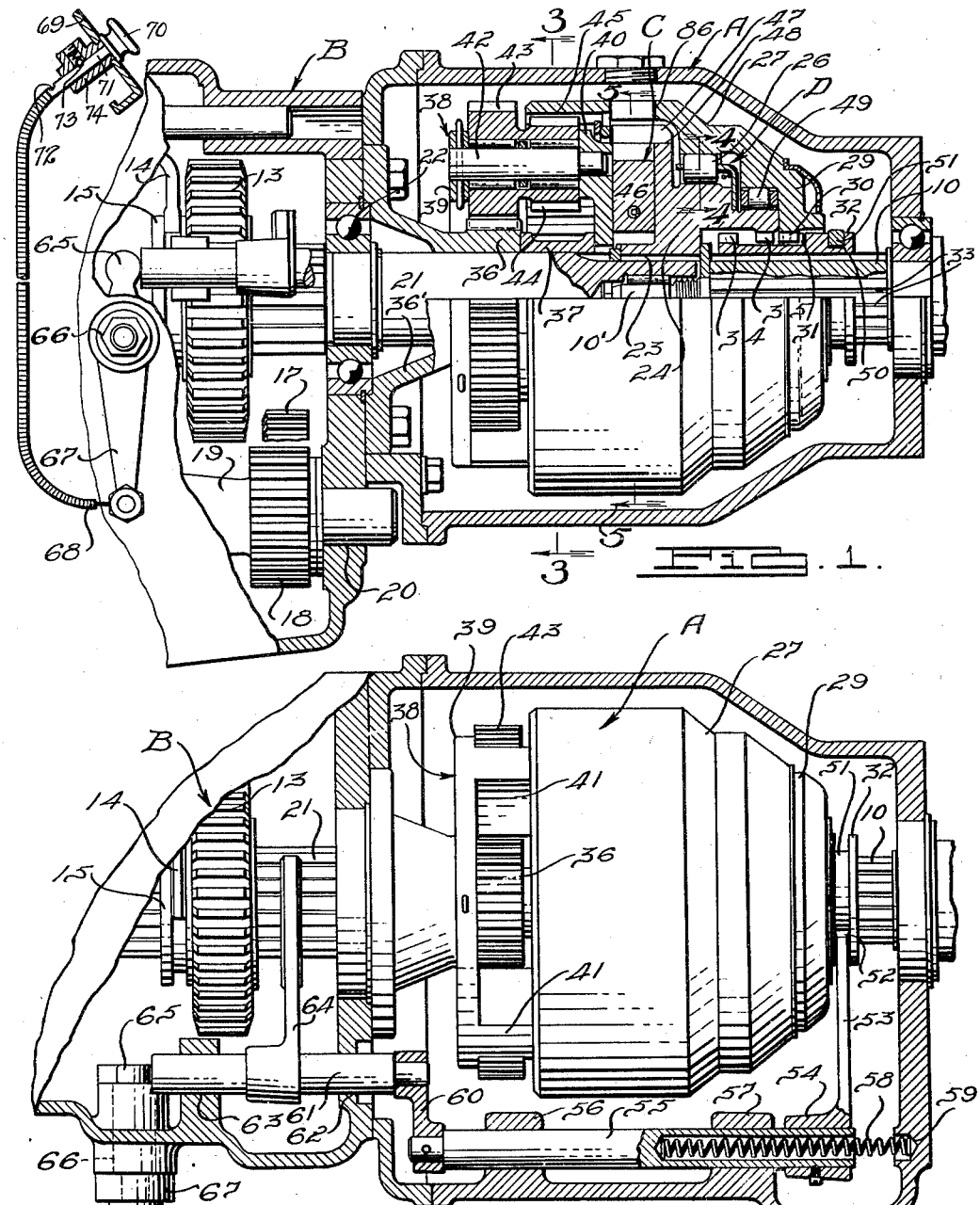

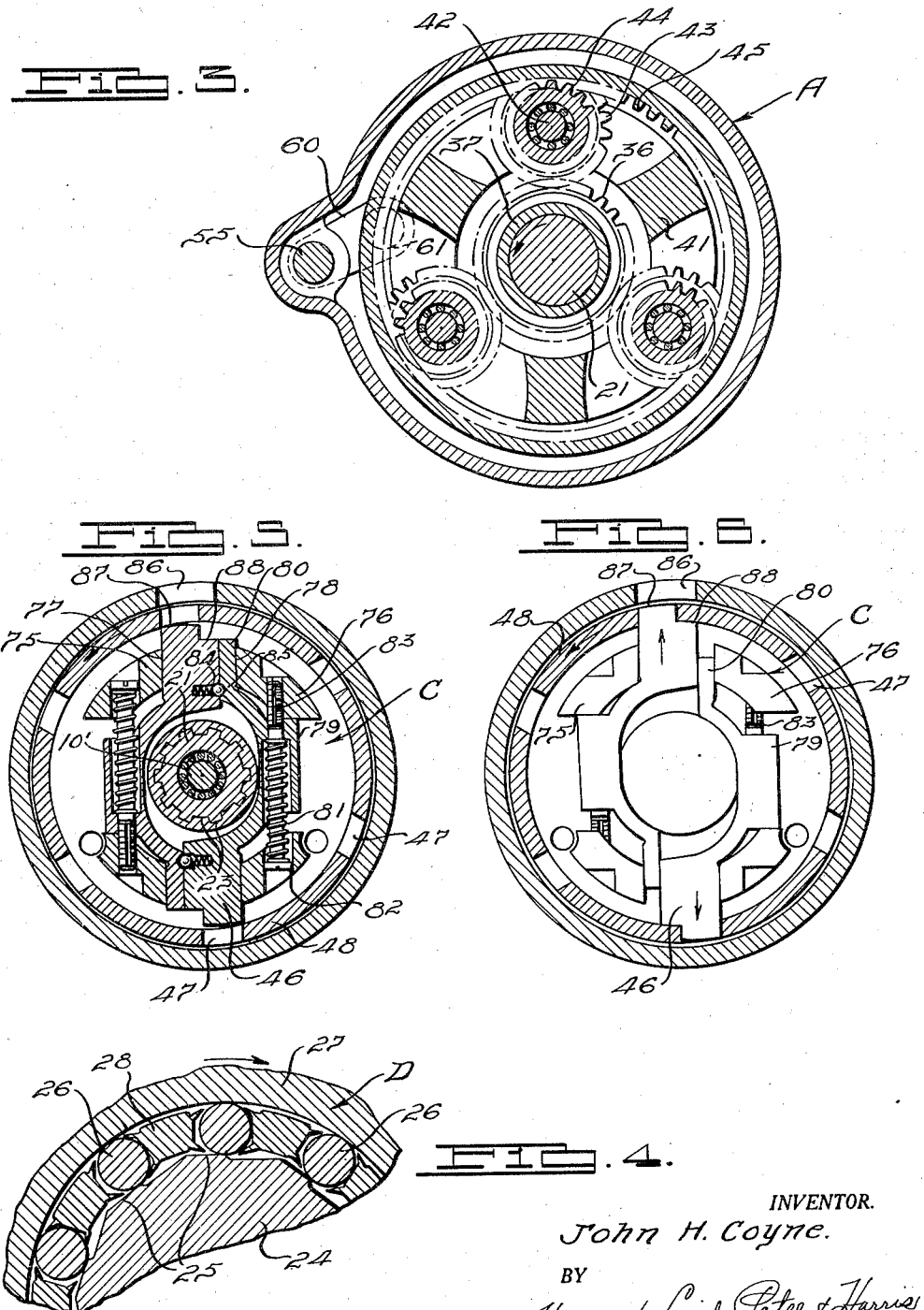

2,147,733

UNITED STATES PATENT OFFICE 2,147,733

DRIVING MECHANISM

John H. Coyne, Highland Park, Mich., assignor to Chrysler Corporation, Detroit, Mich., a corporation of Delaware Application February 8, 1934, Serial No. 710,205

12 Claims. (Cl. 74—260)

This invention relates to driving mechanisms and refers more particularly to improvements in driving mechanisms for motor cars or vehicles, especially where it is desired to vary the driving speed ratio between the vehicle engine or prime mover and the propelling ground wheels.

One object of my invention resides in the provision of an improved driving mechanism adapted, under predetermined desired conditions, to automatically effect the drive for the vehicle. My driving mechanism is preferably adapted for use in connection with a speed ratio changing transmission of any desired type, and is adapted to establish an auxiliary driving speed ratio for the vehicle, such as an overdrive ratio, for example.

A further object of my invention resides in the provision of an improved driving or speed ratio changing mechanism adapted to automatically respond in its actuation to predetermined desired conditions of operation of the vehicle. Thus, by way of example, I have provided an overdrive which is automatically effective when the vehicle attains a predetermined speed so that, on reaching this critical speed, the overdrive becomes effective and on falling below this critical speed the overdrive becomes ineffective.

In carrying out the aforesaid objects of my invention I have provided an improved form and arrangement of an auxiliary driving mechanism which, where an overdrive speed ratio is desired for the vehicle, is driven, when inoperative as a drive, at a speed less than that of a shaft or other part cooperating therewith and driven from the engine. Ordinarily, I prefer to arrange my auxiliary driving mechanism between driving or driven shafts or other parts respectively responsive in their actuation to the speed of the engine and vehicle driving speeds, the auxiliary driving mechanism being thus driven, when inoperative, from the driven shaft and at a speed less than that of the driving shaft by the amount or ratio of overdrive desired.

In order to effect the aforesaid automatic engagement and disengagement of the drive through the auxiliary driving mechanism, I have provided a clutch which will automatically connect and release the clutch control parts of the auxiliary drive under predetermined desired conditions of relative speeds of the engine and vehicle, or driving and driven shafts. This automatic clutch is preferably of the type having a cage or core carrying one or more pawls or dogs responsive to centrifugal force at the desired critical speed for movement of the pawls into clutching relationship with a cooperating companion clutch member or shell formed with suitable pawl engaging slots or openings, the pawl carrying cage being driven with either the engine driving shaft or the vehicle driven shaft, and the slot carrying shell being driven with the other of these shafts. If desired, other types of clutches may be used to control the auxiliary driving mechanism within the broader aspects of my invention.

A further object of my invention resides in the provision of what may be termed primary driving means in addition to said auxiliary driving mechanism for driving the vehicle independently thereof, and in an improved form and arrangement, said means preferably being under manual control so that the drive may be established independently of the auxiliary drive and automatic clutch associated therewith. The primary driving means may thus provide the normal driving medium between the engine and vehicle drive either throughout the entire speed range of the vehicle or up to the aforesaid critical speed at which time the automatic clutch transfers the drive to and through the said auxiliary driving mechanism.

Another object of my invention resides in the provision of an auxiliary driving mechanism occupying a relatively small space and being simple in construction, quiet in operation and capable of manufacture at relatively small cost. Thus, according to one aspect of my invention, I have provided an improved form and arrangement of auxiliary driving mechanism preferably embodying a novel arrangement of planetary gearing intermediate the power driving shaft and the driven shaft, the planetary gearing driving one of the clutching parts of the automatic clutch. It is generally desirable to provide a relatively small amount or ratio of overdrive through the auxiliary driving mechanism and where a double set of planetary gears is provided in order to obtain this relatively small amount of overdrive, such gearing undesirably complicates the auxiliary mechanism, occupies a relatively large amount of space and is rather expensive in production. Where a single planetary gear set is used for the auxiliary driving mechanism, it is impossible to keep the sizes of the gears small in diameter and at the same time provide the relatively small amount of overdrive ratio which is usually desirable. By reason of my invention I have provided a single planetary gear set which at the same time provides gear ratios within wide limits without increasing the sizes of the planetary gears undesirably. In this connection I have provided a set of planetary gearing comprising a planet carrier provided with double planet gear pinions, these planet gear pinions providing the desired auxiliary driving ratio which may be desired. The sizes of the gears may thus be kept relatively small thereby avoiding the objections and difficulties experienced with a single planetary gear set with the usual single planetary gear pinion and I have also avoided the more complicated and expensive form of a multiple arrangement of complete planetary gear sets.

A still further object of my invention resides in the provision of an improved form and arrangement of overrunning or free wheeling clutch as a part of the aforesaid primary driving means. With such arrangement, the vehicle may overdrive the engine, the auxiliary and primary drives and parts associated therewith being arranged so that when engagement of the automatic clutch takes place to drive the vehicle through the auxiliary driving mechanism, the overrunning clutch is preferably thereby rendered simultaneously ineffective, the overrunning clutch and primary driving means being automatically effective when the automatic clutch releases its drive, as when the vehicle speed drops below the predetermined critical speed.

Another object of my invention resides in the provision of improved means responsive to manually controlled manipulation of the said speed ratio changing transmission into the transmission setting for reversing the normal direction of vehicle drive, for automatically locking out or rendering the said overrunning clutch ineffective, this means being preferably in addition to the aforesaid manually controlled means for the overrunning clutch or automatic clutch or both as may be desired in any particular installation.

Further objects of my invention reside in the provision of an improved driving mechanism and in the novel combination and arrangement of parts thereof more particularly hereinafter described and shown in one embodiment in order to illustrate the details and principles of my invention, reference being had to the accompanying drawings in which:

Fig. 1 is a sectional elevational view through my power driving mechanism.

Fig. 2 is a plan view thereof, the casing being broken away to illustrate the operating parts of the mechanism.

Fig. 3 is a sectional elevational view taken through the line 3—3 of Fig. 1.

Fig. 4 is a sectional elevational view through a portion of the overrunning or free wheeling clutch, the section being taken along the line 4—4 of Fig. 1.

Fig. 5 is a sectional elevational view through the automatic clutch illustrated in the disengaged position, the section being taken along the line 5—5 of Fig. 1.

Fig. 6 is a somewhat diagrammatic view of the automatic clutch shown in Fig. 5, the clutch being illustrated in its engaged position.

In the drawings, I have illustrated my driving mechanism A interposed between a speed ratio changing transmission B and the driven shaft 10, the latter extending rearwardly to drive the rear wheels (not shown) of the motor car or vehicle in the usual well-known manner, it being understood that I have elected to show my invention in association with a motor vehicle drive, although my invention in its broader aspects is not necessarily limited thereto. Furthermore, my driving mechanism may be used to advantage at various other points in the line of general power transmission between the vehicle engine and the driven wheels, or between driving and driven means such as shafts of other types of devices.

The transmission B may be of any suitable type such as the conventional selector type operated in the well-known manner through the usual selector controls whereby the various adjustments may be made to the transmission in order to provide the speed ratios in the line of drive through the transmission.

Inasmuch as transmission B may for the most part be of general conventional construction and operation, I have shown only a portion of the gearing and controls of this transmission in Figs. 1 and 2 wherein 13 represents the gear adapted to be shifted by arm 14 and collar 15 associated therewith, arm 14 being actuated by the usual reverse selector control to shift the gear 13 to the right as viewed in Fig. 1 for engagement with the usual reverse idler gear 17 in order to effect a reverse drive from the normal direction of drive to the driven shaft 10. The idler gear 17 is in constant mesh with the driving reverse gear 18 of the transmission countershaft 19, the latter having a bearing 20 in the casing of the transmission. Thus, by appropriate actuation of the usual gear shift lever (not shown) gears 13 and 17 may be engaged so as to reverse the drive, it being understood that other manipulations of the gear shift lever are adapted to selectively produce other desired speed ratio changes in the normal direction of rotation for driven shaft 10.

The power coming from the usual engine or other prime mover which may be located forwardly of transmission B, drives the transmission and the power is taken from this transmission by a power driving means or shaft 21 rotatable in a bearing 22, the shaft having a portion extending rearwardly into the driving mechanism A, this extending portion of the shaft being provided with splines 23. The rear end of shaft 21 pilots the forwardly extending end of the driven shaft 10 as indicated at 10′.

My driving mechanism A provides, among other things, an auxiliary driving means or mechanism between the driving and driven shafts 21 and 10 respectively, this driving means being preferably of a construction adapted to provide a speed ratio between the shafts of an overdriving character whereby driven shaft 10 may, under certain conditions hereinafter described, be driven from the driving shaft at a speed greater than a direct drive between these shafts, it being understood that the engine will in such instances be relatively slowed down with respect to its normal speed of actuation for a given speed of vehicle travel. If desired, the mechanism A may be rearranged to provide an underdrive instead of an overdrive, although I prefer to arrange the gearing for an overdrive of the driven shaft 10.

I preferably incorporate in my driving mechanism as a part of the primary driving means between driving shaft 21 and driven shaft 10, an overrunning or free wheeling clutch D best shown in Figs. 1 and 4. This clutch may in itself be of any suitable form, the illustration showing a conventional device in which the inner cam member 24 is driven by the splines 23 of shaft 21, the cam faces 25 being engaged by cylinders 26 so that by the driving rotation of shaft 21 the high sides of cam faces 25 will wedge the cylinders 26 between cam member 24 and the outer cylindrical driven member 27 of the overrunning clutch to establish a direct drive thereto. The usual spacers 28 maintain the cylinders in spaced position, it being apparent that whenever the engine or driving shaft 21 slows down, the vehicle and driven shaft 10 may, by reason of the clutch D overrun the driving shaft, other conditions permitting such action as will be presently apparent.

The cylindrical portion 27 of the overrunning clutch D is formed with a rearward extension 29 provided with an annular series of internal teeth or jaws 30 complementary to corresponding teeth 31 illustrated in Fig. 1 as being engaged therewith, the teeth 31 being carried by a shiftable clutch controlling device 32 driven by the splines 33 of the driven shaft 10, the arrangement being such that clutch 32 may be shifted rearwardly or to the right as viewed in Fig. 1 to disengage teeth 30 and 31 and to then engage a second series of teeth 34 carried by the clutch device 32 with complementary teeth 35 formed on a rearwardly extending portion of the inner cam member 24 of the free wheeling clutch D. When clutch 32 is in its forward position as illustrated in Fig. 1, the driving shaft 21 drives the driven shaft 10 through the members 24 and 27 of the overrunning clutch D, the drive passing from cylindrical member 27 and extension 29 thereof to the clutch 32. When the clutch 32 is shifted rearwardly as aforesaid, driving and driven shafts 21 and 10 respectively will be connected through cam member 24 and clutch 32 so as to lock out or render the overrunning clutch D inoperative.

Referring now to my planetary gearing, I have provided a sun gear 36 fixed by a bracket 36' to the casing of the overdrive mechanism A, the shaft 21 freely rotating within this sun gear. I have also provided a planet carrier 38 which includes axially spaced portions 39 and 40 thereof connected at circumferentially spaced intervals by the tie members 41 and in between these tie members are the planet gear shafts 42 supported by the members 39 and 40 of the planet carrier 38. Journaled on each of the shafts 42 is a planetary gear pinion 43 meshing with the aforesaid sun gear 36, each pinion 43 having a rearwardly extending portion thereof formed with a second planetary gear pinion 44 meshing with the internal gear 45. The planet gears 43 and 44 have different diameters or they may be said to be stepped relatively to each other. The planet carrier 38 is held in position by the spacer sleeve 37 which engages the sun gear 36. This internal gear is formed as a forwardly extending portion of the outer cylindrical member 27 of the overrunning clutch D. A clutch C, preferably of the automatic type, has its pawls 46 driven, when the clutch is disengaged, by the portion 40 of the planet carrier 38. The pawls are adapted to engage slots 47 of the companion clutch member or shell 48. This shell is formed as an outward extension of the cam member 24 of the overrunning clutch D and is therefore driven at all times from the driving shaft 21 by reason of the aforesaid splines 23. A bearing 49 is located between the rearward extending portions of the inner and outer members 24 and 27 respectively of the overrunning clutch D.

The aforesaid clutch 32 is provided with an annular groove 50 engaged by a yoke 51 best shown in Fig. 2. This yoke extends laterally through an arm 53 to a hub 54 fixed to a shiftable rod 55 adapted to reciprocate in guides 56 and 57 provided by the casing of the driving mechanism A. The rod 55 is bored out to receive a spring 58 reacting against a fixed abutment 59, this spring 58 acting to normally move rod 55 forwardly or to the left, as viewed in Figs. 1 and 2, to position the parts associated therewith as illustrated in these views.

Rod 55 is connected through an arm 60 with a second rod portion 61 thereof slidable in bearing portions 62 and 63 of the casing of transmission B, the rod portion 61 having a laterally inwardly extending arm 64 fixed thereto. The arm 64 is normally spaced from the shiftable reversing gear 13 but is adapted for engagement therewith during movement of this gear when the latter is positioned for engagement with the driving reverse idler gear 17 for establishing the aforesaid reverse drive through the transmission. The arrangement is such that when gear 13 is shifted as aforesaid into engagement with gear 17 for establishing the reverse drive, arm 64 will be engaged toward the latter part of the movement of gear 13 so as to move the rod 55 rearwardly or to the right as viewed in Figs. 1 and 2, thereby shifting the clutch 32 along the splines 33 to disengage teeth 30, 31 and to engage teeth 34, 35 to lock out the overrunning clutch D. When the reversing gear 13 is restored, spring 58 acts to restore clutch 32 to the Fig. 1 position unless held in its rearward position by the manually operated dash controlling device which will be hereinafter referred to.

In addition to the aforesaid manually operated means for shifting the position of clutch 32 in response to a setting of the reverse gearing of transmission B, I have also provided a further manually controlled means for shifting the clutch 32 independently of the movement thereof under the influence of the reverse setting of the transmission. To this end I have provided a lever 65 pivoted at 66, the lever having a downwardly extending arm 67 adapted to be actuated by suitable linkage such as the Bowden wire 68. This wire, as diagrammatically illustrated in Fig. 1, extends for convenient manipulation by the vehicle driver, such position being indicated by the usual dash 69 which mounts a handle or knob 70 connected to the other end of the Bowden wire 68. The handle 70 is adapted for movement by the hand of the vehicle driver, this handle being guided from its position illustrated in Fig. 1 to a position in spaced relationship from dash 69, in which extended position the guide portion 71 of the handle registers a notch 72 thereof with spring pressed ball 73 carried by guide block 74. The ball 73 and the notches engageable therewith cooperate to advise the operator of the proper positioning of handle 70 for effecting the desired movement of lever 65. It will be noted that when handle 70 is pulled outwardly from dash 69, lever 65 will move rod portion 61 and rod 55 against the tension of spring 58 so as to shift the clutch 32 to disengage teeth 31 and to engage teeth 34, 35 independently of this similar clutching and declutching action caused by the shifting of the reverse gear 13 as aforesaid. It will be apparent that when gear 13 is shifted to engage the reverse gear 17, such movement is also independent of movement of lever 65 under the influence of handle 70. When the clutch device 32 is shifted rearwardly by engagement of notch 72 with ball 73, the clutch device will be maintained in this position until the handle 70 is restored to the position illustrated in Fig. 1 whereupon the spring 58 will act to restore the clutch device 32 to its position also illustrated in Fig. 1.

Referring now to the details of clutch C which is preferably of the automatic type, one form of which is illustrated in Fig. 5, the planet carrier member 40 is provided with diametrically arranged pairs of lateral extensions or pawl guides 75 and 76. Extensions 75 have pawl engaging faces 77 and extensions 76 have similar bearing faces 78. Fitting within shell 48 are a pair of the said pawls 46, each having a face in sliding engagement with a face 77 of extension 75 and each extending generally inwardly of the pawl carrying cage. Thus, each pawl is formed with a yoke portion 79 normally seated on an extension 76, each yoke portion having a guide 80 slidable intermediate a face 78 and the sides of the other pawl opposite the side thereof in engagement with the face 77.

In order to normally urge the pawls inwardly of the pawl cage to position the parts as shown in Fig. 5, springs 81 are provided, each spring acting on the head 82 of the screw bolt 83 threadedly engaging suitable openings in extensions 76, the yoke portions 79 being also provided with suitable openings so as to receive the respective bolts 83 and springs 81 cooperating therewith. If desired, each pawl 46 may be provided with a spring actuated ball detent 84 releasably engaging a recess 85 in the pawl guide portion 80 of the other pawl to assist in holding the pawls in stabilized condition and to prevent hunting prior to their release for outward clutching movement.

The shell 48 has the aforesaid plurality of circumferentially spaced pawl receiving slots or openings 47 suitably spaced so that diametrically arranged pairs of slots will simultaneously register with the pawls 46 so as to receive said pawls under conditions hereinafter more apparent.

The threaded ends of screw bolts 83 permit adjustment of the springs 81 when the heads 82 of these bolts are rotated by means of a suitable tool such as a screw driver. Such adjustment may be readily made by rotating the parts as assembled so that the slots 47 will register with one of the screw bolt heads 82 thereby permitting the aforesaid tool to be engaged. The forward extension of the cylindrical member 27 is also provided with an opening 86 adapted to register with a suitable opening in the casing of the auxiliary driving mechanism so that when all of these openings are aligned the aforesaid adjustment of springs 81 is thereby facilitated.

The engaging ends of the pawls 46 are preferably provided with cam faces 87 acting on the inner edges of slots 47 to progressively release the pawls outwardly when the clutch shell and cage are rotating substantially together at a predetermined speed. When pawls 46 move outwardly in slots 47, such movement is limited by engagement of yoke portions 79 with projections 75, the yoke portions sliding on the bolts 83. Shoulders 88 of pawls 46 also serve to limit the outward movement of the pawls, these shoulders being adapted to engage the inner portion of shell 48 adjacent the slots 47. Inward movement of the pawls 46 under the action of springs 81 is limited by engagement of the yoke portions 79 with the associated projections 76. In operation of the power transmitting mechanism with the parts positioned as in Fig. 1, the engine will drive shaft 21 and hence the driven shaft 10 to drive the vehicle forwardly in direct drive so far as the driving and driven shafts 21 and 10 respectively are concerned. This direct drive takes place from shaft 21 through the free clutch D and thence to driven shaft 10. When the vehicle tends to overrun the engine such action may take place by reason of clutch D. During this direct drive the shell 48 will be driven by splines 23 of shaft 21 at the speed of shaft 21 while the pawls 46 will be rotated by planet carrier member 40 at a speed less than that of the driven shaft 10 and driving shaft 21 by reason of the reduction through the aforesaid planetary gearing. This planetary gearing reduction, with the parts operating as aforesaid, is obtained by reason of the internal gear 45 rotating at the speed of the driven shaft 10, the sun gear 36 being fixed. It will be apparent that the stepped or different diameter planetary gear pinions 43, 44 will operate to drive the planet carrier 38 in the same direction as that of driven shaft 10 but at a slower speed.

By way of illustrating one manner of operation of my automatic clutch C, this clutch is illustrated as being adapted to automatically lock out or to render the free wheeling clutch D ineffective and to simultaneously drive shaft 10 from shaft 21 at a predetermined speed of rotation of shaft 10 and hence a predetermined speed of vehicle travel. When such clutching action takes place, the shaft 10 is driven from shaft 21 as aforesaid by reason of the planetary gearing. This drive provides an overdrive or a higher speed of the driven shaft 10 than that of the driving shaft 21. An overdrive is ordinarily desirable at only relatively high speeds of vehicle travel and hence, by a suitable selection and setting of the pawl springs 81, assisted somewhat by the detents 84, these pawls may be held inoperative against the influence of centrifugal forces acting to move the pawls outwardly until the desired predetermined critical speed has been reached. Assuming, by way of example, that such automatic overdrive is desired at approximately 50 miles per hour of vehicle travel, then, when the vehicle is being driven at this speed, the pawls are urged outwardly by centrifugal force to engage slots 47 of the shell 48 when rotation of the pawl cage and shell becomes substantially uniform. Under the assumed conditions, springs 81 may be set so that the pawls tend to fly outwardly at a speed of shaft 10 corresponding to 50 miles per hour of vehicle travel, the pawls being restrained from moving outwardly, until the clutch parts are synchronized, by reason of the gear reduction which drives the pawls at a slower speed than that of slots 47 which are driven directly from the driving shaft 21.

Owing to the difference in rotational speeds of the slots and pawls, the parts pass each other with such rapidity that the pawls do not have time to move outwardly to engage the slots and the parts continue to slip until the operator momentarily releases or diminishes the power of the engine applied to shaft 21 so as to permit the shell 48 to decelerate by reason of the overrunning clutch D, the shifting clutch 32 being in the position shown in Fig. 1. In decelerating, the shell 48 obviously very quickly drops to the speed of the pawl cage, momentarily synchronizing the pawls with a pair of diametrically arranged slots 45, the pawls thereupon being guided out during rotation thereof by cam faces 87 for effecting initial engagement of the pawls in the slots. Once engaged, the centrifugal force acting on the pawls carries them outwardly for fully engaging the slots of shell 48 as shown in Fig. 6 and the overdrive immediately takes place with the free wheeling clutch D locked out as aforesaid.

As long as the engine drives the vehicle at or above the aforesaid overdrive speed with the pawls 46 engaged in slots 47, the clutch C will remain engaged. However, when the vehicle slows down below the aforesaid 50 miles per hour, in the assumed illustration, the pawls 46 will be urged to their retracted or normal position of Fig. 5, such retraction taking place just as soon as the friction of the drive is relieved or reversed between the sides of the slots and pawls. Thus, when the vehicle driver momentarily releases the usual accelerator pedal to cause the vehicle to drive the engine, this reversal of drive permits retraction of the pawls and the power transmission is then again operating without the overdrive and through the freewheeling clutch D.

When it is desired to drive the vehicle in reverse, the gear 13 is moved by the shifter arm 14 into engagement with the reverse idler gear 17. This causes rearward movement of arm 64 to move clutch 32 rearwardly, as viewed in Fig. 1, so as to disengage teeth 30, 31 and engage teeth 34, 35 to lock out the free wheel clutch D. This reverse drive thus passes from shaft 21 to cam member 24, clutch 32 and thence to the driven shaft 10, it being understood that shaft 10 has its rotation reversed by the reversing mechanism of the transmission D. The clutch 32 may also be actuated to lock out the overrunning clutch D when the automatic clutch C is not in its clutching action, by pulling handle or knob 70 so as to cause lever 65 to actuate the rod portion 61, rod 55 and clutch 32 independently of the aforesaid shifting movement of the reverse gear 13.

By reason of my arrangement of clutching means 32 between one of the main shafts such as the driven shaft 10 and the overrunning clutch members 24 and 27, it will be noted that in shifting clutch 32 a momentary neutral condition exists at which time the overrunning clutch members are relatively disconnected, viz., one of these members such as the member 27 is released from its shaft which in the instance of my illustrative embodiment is the driven shaft 10. Therefore, on shifting clutch 32 to the lock-out position jamming between the teeth 34 and 35 is prevented thereby facilitating both engagement and disengagement of these teeth.

I desire to point out that instead of driving the slot carrying shell 48 directly from the drive shaft 21 and hence from the engine, and the pawl cage from the driven shaft 10, such parts may be readily reversed if desired so as to drive the pawl cage directly from the engine and the slots from the vehicle driven shaft 10. The illustrated arrangement is preferred in certain instances since the engine continues to drive at the overdrive speed from the time when the pawls are engaged in the pawl slots viz. at a speed slower than in direct drive for the same vehicle speed. With the suggested reversal of clutch parts the engine would have to operate somewhat faster by the overdrive ratio, than the driven shaft to speed up the slot carrying member and then by slowing down the engine momentarily to reduce the speed of the pawl cage to that of the slot carrying member, the pawls will engage the slots. In such instance, it is therefore apparent that the engine would have to drive at a speed greater than its speed for the overdrive setting of the pawls in order to establish the proper conditions for effecting actuation of the automatic clutch C. However, this condition may be readily offset by arranging the pawls to engage at a somewhat slower speed than would be otherwise the case and it will be apparent that either arrangement may be readily used.

While I have illustrated my invention in connection with an overdrive mechanism for motor vehicles, I desire to point out that this is but one useful application or use of my driving mechanism which may be used to advantage wherever clutching action between two rotatable parts is desired, particularly where such action is to be automatically responsive to desired conditions of relative rotatable speeds of the two members to be clutched or declutched.

While I do not limit my invention in its broader aspects, to a clutch C of the automatic type or to any particular relationship of spring forces and centrifugal forces acting on the pawls of an automatic type of clutch, I prefer to incorporate an automatic clutch as a part of my invention and to provide the pawls thereof in substantially balanced or floating condition at the speed of rotation of the pawl cage where clutching action is desired. Thus, I prefer to arrange the spring rate so that at the critical speed of engagement, the centrifugal forces acting on any pawl will be substantially counterbalanced by the pull of the pawl spring so that the pawl can readily move outwardly into clutching position. At the end of the outward displacement of the center of gravity of any such pawl, the pawl is preferably also substantially counterbalanced by the inward pull of the spring associated therewith. Centrifugal force is proportional to the distance of the center of gravity of a rotating mass from its axis, and the increase of this force due to the increase of the center of gravity distance is counterbalanced by an increase of the spring load occasioned by the pawl movement. This spring rate is thus preferably one which balances the increase in centrifugal force during outward pawl movement.

I do not limit my invention, in the broader aspects thereof, to any particular combination and arrangement of parts such as shown and described for illustrative purposes since various modifications will be apparent within the teachings of my invention as defined in the appended claims.

What I claim is:

1. In a vehicle drive, a power driving shaft, a driven shaft aligned with said drive shaft, means for establishing a direct one-way drive between said shafts including cooperating overrunning clutch members adapted to be driven by said shafts respectively, one of said overunning clutch members having a gear driven therewith, a clutch element, a gear train for driving said clutch element from the first said gear, a second clutch element adapted to drivingly engage the first said clutch element, means for driving said second clutch element from one of said shafts at the same speed as that of the other of said overrunning clutch members, each of said overrunning clutch members being provided with a set of clutching teeth, shiftable clutch means driven by one of said shafts and adapted to selectively clutchingly engage said sets of clutching teeth whereby only one of said sets of teeth are engaged by said shiftable clutch means at any time.

2. A vehicle drive according to claim 1 wherein said shiftable clutch means is entirely disengaged from both of said sets of clutch teeth in moving from engagement with one to engagement with the other of said sets of teeth.

3. In a change speed driving mechanism, a drive shaft, a driven shaft, an overrunning clutch having driving and driven members respectively adapted for driving connection to said shafts whereby said drive shaft may transmit a direct one-way drive to said driven shaft, means including a clutch controlled gear train for driving said driven shaft from said drive shaft at a speed ratio different than said direct drive, said speed ratio driving means including a part adapted for driving connection with one of said shafts and a second part adapted for driving connection with one of said overrunning clutch members, said speed ratio driving means further including speed responsive clutching means for establishing said drive through said gear train in response to overrunning action of the driven shaft, clutching means carried by each of said overrunning clutch members, and manually controlled shiftable clutch means continuously driven by one of said shafts and adapted to be shifted into positions of selective clutching connection with said clutching means of each of said overrunning clutch members.

4. In a change speed driving mechanism, a drive shaft, a driven shaft, an overrunning clutch having driving and driven members respectively adapted for driving connection to said shafts whereby said drive shaft may transmit a direct one-way drive to said driven shaft, means including a clutch controlled gear train for driving said driven shaft from said drive shaft at a speed ratio different than said direct drive, said speed ratio driving means including a part adapted for driving connection with one of said shafts and a second part adapted for driving connection with one of said overrunning clutch members, said speed ratio driving means further including speed responsive clutching means for establishing said drive through said gear train in response to overrunning action of the driven shaft, clutching means carried by each of said overrunning clutch members, and manually controlled shiftable clutch means continuously driven by one of said shafts and adapted to be shifted into positions of selective clutching connection with said clutching means of each of said overrunning clutch members, said shiftable clutch means when in one of its said shiftable positions serving to drivingly connect one of said overrunning clutch members with one of said shafts to provide said one-way drive, said shiftable clutch means when moved to another of its said shiftable positions releasing said one-way driving connection prior to clutchingly engaging the other of said overrunning clutch members, said shiftable clutch means when shifted to said latter position providing a direct two-way drive between said shafts.

5. In a power transmission, a drive shaft, a driven shaft, an overrunning clutch including driving and driven members respectively adapted for driving connection to said shafts for transmitting a one-way drive therebetween, clutch teeth continuously drivingly connected to each of said members, a manually shiftable clutch device having teeth adapted for selective engagement with the teeth of said overrunning clutch members, and means for driving said clutch device from one of said shafts, said clutch device releasing said engagement with the teeth of one of said overrunning clutch members prior to engagement with the teeth of the other of said overrunning clutch members in providing a two-way direct drive between said shafts.

6. The combination with a driving shaft and a driven shaft, of a planetary gearing for driving said driven shaft at a different speed than that of the driving shaft, a clutch for establishing driving relation between said shafts through said gearing, means for preventing the engagement of the members of said clutch until the speed of one of the clutch members has reached a predetermined point, said clutch being so constructed that engagement will not be effected until the two members thereof approach substantially synchronism, and means within the control of the operator and cooperating with said gearing for initially establishing driving connection between one of the members of the clutch and the driven shaft.

7. The combination with a driving shaft and a driven shaft, of a planetary gearing for driving said driven shaft at a different speed than the driving shaft and including a ring gear and a pinion carrier, an automatic clutch for establishing driving relation between the driving and driven shafts through said planetary gearing when the speed of the driven shaft reaches a predetermined point, one of the members of said clutch being drivingly connectable through and gearing and at the will of the operator with the driven shaft.

8. The combination with a driving shaft and a driven shaft, of a planetary gearing for driving said driven shaft at a different speed than that of the driving shaft, a clutch for establishing driving relation between said shafts through said gearing, means for preventing the engagement of the members of said clutch until the speed of one of the clutch members has reached a predetermined point, said clutch being so constructed that engagement will not be effected until the two members thereof approach substantially synchronism, and means within the control of the operator and cooperating with said gearing for selectively establishing driving connection between one of the members of said clutch and said driven shaft or directly between said driving and driven shafts independently of said gearing.

9. The combination with a driving shaft and a driven shaft, of a planetary gearing for driving said driven shaft at a different speed than that of the driving shaft, a clutch for establishing driving relation between the said shafts through said gearing, means for preventing said members of said clutch from moving into engaging relation until the speed of one of said clutch members has reached a predetermined point, said clutch being so constructed that engagement will not be effected until the two members thereof approach substantial synchronism, and means within the control of the operator and cooperating with said gearing for selectively establishing driving connection between one of the members of said clutch and the driven shaft or directly between the driving and driven shafts independently of said gearing.

10. The combination with a driving shaft and a driven shaft, of a gearing for establishing a drive from the driving shaft to the driven shaft at a different speed than that of the driving shaft, a clutch arranged to automatically establish a two-way drive between said driving and driven shafts through said gearing when the driven shaft reaches a predetermined speed, a one-way clutch for establishing a one to one drive between said driving and driven shafts, a two-way clutch for establishing a one to one drive between said driving and driven shafts independently of said one-way clutch and means within the control of the operator for selectively engaging said two-way clutch or engaging said one-way clutch and drivingly connecting one of the members of the automatic clutch through said gearing with the driven shaft.

11. The combination with a driving shaft and a driven shaft, of a gearing for driving said driven shaft at a different rate of speed than the driving shaft, a one-way clutch for driving said driven shaft from the driving shaft, an automatic clutch for establishing a two-way drive between said shafts through said gearing when the speed of the driven shaft reaches a predetermined point, and means within the control of the operator for establishing a two-way drive between said shafts independently of said one-way clutch or of said gearing, or drivingly connecting one of the members of the one-way clutch and one of the members of the automatic clutch through said gearing to the driven shaft, whereby while the speed of the driven shaft remains below a predetermined point a one-way drive will be established between said shafts, and when the speed of the driven shaft reaches a predetermined point a two-way drive will be established between said shafts through the instrumentality of said automatic clutch and said gearing.

12. The combination with a driving shaft and a driven shaft, of a gearing for driving said driven shaft at a different rate of speed than the driving shaft, a one-way clutch for driving said driven shaft from the driving shaft, an automatic clutch for establishing a two-way drive between said shafts through said gearing when the speed of the driven shaft reaches a predetermined point, and means within the control of the operator for establishing a two-way drive between said shafts independently of said one-way clutch or of said gearing or connecting one of the members of the one-way clutch to the driven shaft, whereby while the speed of the driven shaft remains below a predetermined point a one-way drive will be established between said shafts, and when the speed of the driven shaft reaches a predetermined point a two-way drive will be established between said shafts through the instrumentality of said automatic clutch and said gearing.

JOHN H. COYNE.